United States Patent [19]

Norton et al.

[11] Patent Number: 4,548,272

[45] Date of Patent: Oct. 22, 1985

[54] OIL RECOVERY PROCESS USING A POLYMER GEL

[75] Inventors: Charles J. Norton; David O. Falk, both of Denver, Colo.; Alfred D. Hill, Austin, Tex.

[73] Assignee: Marathon Oil Company, Findlay, Ohio

[21] Appl. No.: 525,189

[22] Filed: Aug. 22, 1983

Related U.S. Application Data

[63] Continuation-in-part of Ser. No. 337,570, Jan. 7, 1982, abandoned.

[51] Int. Cl.[4] .................. E21B 33/138; E02D 3/12
[52] U.S. Cl. ................................ 166/295; 405/264
[58] Field of Search .............. 166/273, 274, 275, 270, 166/281, 294, 295, 261, 300; 175/65; 252/8.55 D, 8.5 C; 405/264

[56] References Cited

U.S. PATENT DOCUMENTS

| Re. 29,716 | 8/1978 | Clampitt | 175/65 |
| 3,039,529 | 6/1962 | McKennon | 166/275 |
| 3,782,467 | 1/1974 | Hessert | 166/261 |
| 3,785,437 | 1/1974 | Clampitt et al. | 166/281 |
| 3,795,276 | 3/1974 | Eilers et al. | 166/295 |
| 4,040,484 | 8/1977 | Hessert | 166/294 |

OTHER PUBLICATIONS

Chyi-Gang Huang, M.S. Thesis, "A Study of the Gelation of Polyacrylamide Through the Participation of Chromium (III)", 1980, University of Kansas.

*Primary Examiner*—Stephen J. Novosad
*Attorney, Agent, or Firm*—Jack L. Hummel; Rodney F. Brown

[57] ABSTRACT

A reducing agent is added to an aqueous medium containing a mixture of undried partially hydrolyzed polyacrylamide and an oxidizing agent. The reducing agent and oxidizing agent act as a redox catalyst system to cross link the polymer and form a polymer gel. Gelation time is controlled by maintaining the components of the gel-forming mixture at predetermined concentrations, reaction ratios and pH. The gel-forming mixture is applied to a porous matrix such as a subterranean hydrocarbon-bearing formation where the mixture gels in situ at a controlled rate to reduce the permeability of the porous matrix.

10 Claims, 5 Drawing Figures

OIL RECOVERY PROCESS USING A POLYMER GEL

This is a continuation-in-part application of the copending U.S. patent application, Ser. No. 337,570, filed Jan. 7, 1982, now abandoned.

TECHNICAL FIELD

The invention relates to a process whereby the permeability of a porous matrix is controlled using a polymer gel. More particularly, the permeability of a subterranean hydrocarbon-bearing formation is controlled by mixing gel-forming components above ground and injecting the resulting mixture into the formation wherein in situ gelation occurs at a controlled rate.

BACKGROUND ART

Many processes are known for controlling the permeability of subterranean hydrocarbon-bearing formations to improve the secondary recovery of hydrocarbons. Partially hydrolyzed polyacrylamide gels initiated by redox catalysts are used for permeability control in a number of these processes. U.S. Pat. No. 3,785,437 to Clampitt et al. injects an aqueous slug containing polymer and either a metal-containing oxidizing agent or a reducing agent into a formation. A second aqueous slug is sequentially injected into the formation, which contains only the second component of the redox catalyst system not contained in the first slug, i.e. either the oxidizing or reducing agent. The slugs mix in the formation to produce a cross-linked polymer gel. U.S. Pat. Nos. 3,795,276 to Eilers et al. and 4,040,484 to Hessert accelerate the cross-linking of the water-soluble polymer by adding an acid to decrease the pH of the gelation reaction.

U.S. Pat. No. Re. 29,716, to Clampitt et al. uses a polymer gel as a drilling fluid or well completion fluid. The gel is produced by adding the redox catalysts simultaneously to an aqueous mixture or sequentially adding the oxidizing agent and reducing agent in either order to the aqueous medium. The preferred method is to add the reducing agent to the mixture first.

Chyi-Gang Huang, M.S. Thesis, "A Study of the Gelation of Polyacrylamide Through the Participation of Chromium (III)", 1980, University of Kansas, investigates the subject of polyacrylamide gel preparation and is a good general reference on the subject.

In a non-gelling application, U.S. Pat. No. 3,039,520 to McKennon adds a polymer to a waterflood to increase the viscosity of the flood. A polymer such as PHPA is added above ground to the flooding water either in dried form or in the aqueous form directly as produced.

The above-cited references describe a number of processes using polymers and polymer gels for secondary oil recovery. However, none of these processes provide adequate control of the polymer gelation reaction. Processes which mix the gel-forming components in situ after sequential injection do not achieve sufficient mixing of the components, while processes which mix the gel-forming components above ground followed by injection require imprecise mechanisms to delay gelation until the mixture is in place. In either case, a weak gel results, which does not satifactorily control permeability, and hydrocarbon recovery from the waterflood is not significantly improved.

The problem not solved in the prior art is that of identifying the reaction parameters to which the gelation reaction is most sensitive and controlling those parameters. A process is needed to produce a gel sufficiently stable to control permeability in a subterranean hydrocarbon-bearing formation during a waterflood. More particularly a process is needed whereby the process parameters may be varied to produce gels of different viscosities and gelation times. A process is needed where the gel-forming components are uniformly mixed above ground and the mixture is injected into a subterranean formation to form a homogeneous gel in situ.

DISCLOSURE OF THE INVENTION

According to this invention an aqueous solution containing an undried polymer is mixed with redox catalysts at predetermined concentrations, reactant ratios and pH to produce a polymer gel. The mixture is applied to a porous matrix such as a subterranean hydrocarbon-bearing formation or an earthen dam to decrease the matrix permeability or substantially shut off the flow of fluids through the matrix.

Polymers suitable for use in the practice of this invention include partially hydrolyzed polyacrylamides (PHPA) which are water soluble. The PHPA can have up to about 75 percent or more of the carboxamide groups hydrolyzed to carboxylate groups. The polymers have a molecular weight within the range of about 100,000 to about 10,000,000 or more. The preferred molecular weight of the polymer depends in large part on the particular application of the gel. For example, a polymer used to produce a gel for permeability control in a subterranean hydrocarbon-bearing formation may require a higher molecular weight to withstand formation conditions. The amount of polymer used in the process depends upon the type of polymer, the purity of the polymer and the properties desired in the resulting gel. Generally the polymer concentration in the gel-forming mxture is in the range of from about 0.15 to 10% by weight.

The redox catalysts comprise a dual component system having an oxidizing and a reducing agent. The oxidizing agent is a water-soluble, reducible alkali metal or ammonium salt of a hexavalent chromium ion such as a chromate or dichromate or is chromium trioxide. The reducing agent is an alkali metal or ammonium ion coupled with a sulfur containing ion such as sulfides, sulfites, hydrosulfites and metabisulfites. The redox catalysts are sequentially added to the gel-forming mixture in a specific sequence; the oxidizing agent is added first followed by the reducing agent.

The gel-forming components are combined in an aqueous medium. The medium can be water ranging in hardness from distilled to brackish water.

The gelation time is regulated by controlling the pH of the gel-forming mixture. An acidic pH decreases gelation time, while a basic pH increases gelation time.

The process is particularly applicable to permeability reduction or shutoff of subterranean formations because the gel-forming components may be uniformly mixed above ground and injected into the formation as a single slug. Gelation occurs in situ at a controlled rate determined by the reaction pH and reactant concentrations. The resulting gel is a homogeneous composition having a viscosity varying over a wide range depending on the reactant concentrations. Viscosity is controlled to effect differing degrees of permeability control.

The process is simple and economical because it does not require metered sequential injection of the gel-forming components. The process is versatile because, in addition to subterranean applications, it may be used to consolidate terranean sand or soil. Finally the process is reversible because the gel can be degraded in situ to restore permeability to the porous matrix.

BEST MODE FOR CARRYING OUT THE INVENTION

Figure 1:
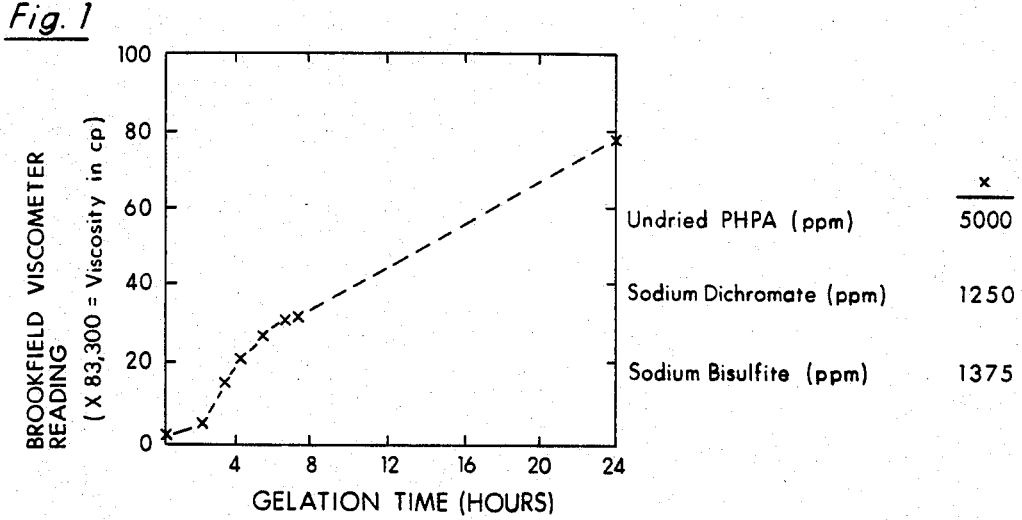
FIG. 1 graphically shows gel viscosity versus gelation time for a given concentration of polymer and redox catalysts combined in produced water described in Example 1.

The invention is a process for controlling the permeability of a porous matrix by applying a gel-forming mixture thereto, which gels in situ. The gel-forming mixture consists of an undried, water-soluble polymer and a redox catalyst system containing an oxidizing and a reducing agent dispersed in an aqueous medium. As used herein, "undried" polymer is defined as polymer which has not been substantially dried at any time after being produced and prior to use in this process, i.e. undried polymer is maintained in an aqueous form from the time it is produced to the time it is mixed with the catalysts in this process.

The order of adding the redox catalysts to the aqueous medium is critical; the oxidizing agent is added first followed by the reducing agent. The polymer may be added to the aqueous medium at any point prior to adding the reducing agent.

According to one embodiment, the gel-forming components are mixed above ground to achieve uniform dispersion of all components in the aqueous medium. The mixture is then injected into a subterranean hydrocarbon-bearing formation where it gels in situ. Gelation time and gel viscosity are controlled by the concentration and ratio of reactants and the pH of the reaction mixture. The process is not limited to this specific embodiment, but may be applied in terranean applications to consolidate soil or sand or to reduce permeability around building foundations, earthen dams or the like.

Water-soluble polyacrylamides are suitable polymers. The preferred polyacrylamide is a partially hydrolyzed polyacrylamide (PHPA) wherein from about 30 percent to about 75 percent or more of the carboxamide groups are hydrolyzed to carboxylate groups. The term "hydrolyzed" includes polymers wherein carboxylate groups are in a water-dispersible salt form. Such salts include the ammonium salts and the alkali metal salts.

The polymer has a molecular weight of from about at least 100,000; preferably at least about 250,000; and more preferably at least about 500,000 to about 10,000,000 or more. The upper limit for the molecular weight of the polymer is only constrained by the solubility of the polymer in water. Generally the PHPA used in this process has a molecular weight of from about 3,000,000 to about 10,000,000. The molecular weight selected primarily depends on the properties of the permeable matrix to be treated. The concentration of polymer to be used depends upon the type of polymer, the purity of the polymer and the desired properties of the resulting gel. Generally the concentration of polymer in the gel-forming mixture is from about 0.15% to about 10% by weight and more preferably from about 0.25% to about 1% by weight.

The preferred oxidizing agent of the redox catalyst system is sodium or potassium dichromate. The preferred reducing agent is sodium sulfite. The reducing agent is preferably present in slight excess to remove dissolved oxygen or other undesirable oxidants from the system. The concentration ranges of the components in the gel-forming mixture vary for different oil recovery applications of the polymer gel. For example, the concentration ranges are higher for a fracturing application than a mobility control application as noted in the table below because fracturing requires a more viscous gel.

| Application | Component Concentrations (ppm) | | |
|---|---|---|---|
| | Polymer | Dichromate | Sulfite |
| Fracturing | 1,000–30,000[1] | 500–7,500 | 600–8,000 |
| Mobility Control | 250–5,000 | 50–1,300 | 60–1,400 |

[1]Top values apply to low molecular weight PHPA only.

For subterranean mobility control applications, the degree of mobility control achieved is directly proportional to the amount of gel-forming mixture injected into the formation and the concentration of components in the mixture. Viscosity of the gel increases directly as a function of concentration of the polymer and redox catalysts. However, from an economic standpoint, it is desirable to determine the lowest acceptable degree of mobility control for a given formation to minimize the amount of gel-forming mixture required in the treatment. It is also desirable to maintain an upper limit on component concentrations in the mixture so that gelation does not occur prematurely before the mixture is in place in the formation. These factors mitigate against injecting excessive amounts of high concentration gel-forming mixture into a subterranean formation.

Gelation time is not only a strong function of component concentration, but also of pH of the reaction mixture. Gelation time is reduced by decreasing the pH of the gel-forming mixture. Conversely increasing the pH increases gelation time. Delayed gelation may be effected by basifying and buffering the gel-forming mixture to preserve its basicity above 7. Gelation is delayed for the duration of a predetermined time interval, such as the time required for the mixture to reach the intended site of in situ gelation in a subterranean application. Once the time interval expires, the pH of the mixture may be reduced to values below 7 to initiate the gelation reaction. The pH of the mixture is reduced by acidifying it, such as injecting an aqueous HCl solution, an acid-forming gas, or a microencapsulated acid into the formation ahead of or behind the mixture.

The following examples are illustrative of applications of the present invention and are not to be construed as limiting the scope thereof.

EXAMPLE 1

Gel-forming components are added to a produced water from the Byron Reservoir in Wyoming at a temperature of 50° C. in the following concentrations: 5000 ppm undried PHPA, 1250 ppm sodium dichromate and 1375 ppm sodium bisulfite. The ratio of PHPA:dichromate:bisulfite in the resulting mixture is 4:1:1. The average molecular weight of the PHPA is about 3,000,000. Brookfield viscosity readings of the mixture are recorded as a function of time. To convert to nominal centipoise (cp) values, the Brookfield viscosity is multiplied by a factor of 83,300. The plot of viscosity as a function of time corresponds to the gelation rate. FIG. 1 graphically displays Example 1.

As FIG. 1 indicates, there appear to be three different stepwise rate controlling mechanisms in the gelation reaction. The first step, from about 0 to 2 hours, is an induction-like period during which cross-linking chromic cations probably associate with the carboxylate sites of the polymer. This increases the polarity of the polymer chain causing mutual repulsion among polymer chains so that little increase in viscosity results. The second step, from about 2 to 7 hours, is very fast. This step is probably a cross-linking of two polymer chains which causes a pronounced increase in viscosity. The third and final step after 7 hours is a slower high-entropy step wherein two cross-linked polymers react with the sterically cumbersome carboxylate groups of a third polymer to generate another linkage with the chromic cation.

EXAMPLE 2

Figure 2:
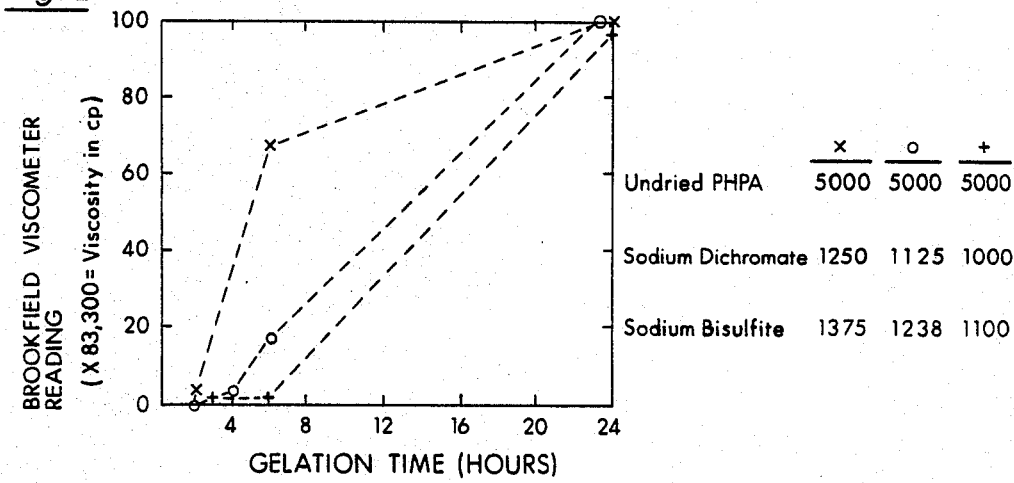
FIG. 2 graphically shows the effect of reducing the redox catalyst concentration on gelation time and gel viscosity decribed in Example 2.

Redox catalysts are added to a 5000 ppm PHPA solution containing the same type of produced water and PHPA as Example 1. Runs are made with three different concentrations of redox catalysts as graphically shown in FIG. 2. The line marked "x" is 1250 ppm dichromate and 1375 ppm bisulfite, the line marked "o" is 1125 ppm dichromate and 1238 ppm bisulfite and the line marked "+" is 1000 ppm dichromate and 1100 ppm bisulfite. The gelation rate is strongly dependent on the concentration of redox catalysts but the final gel viscosity is substantially the same in the all three cases.

EXAMPLE 3

Figure 3:
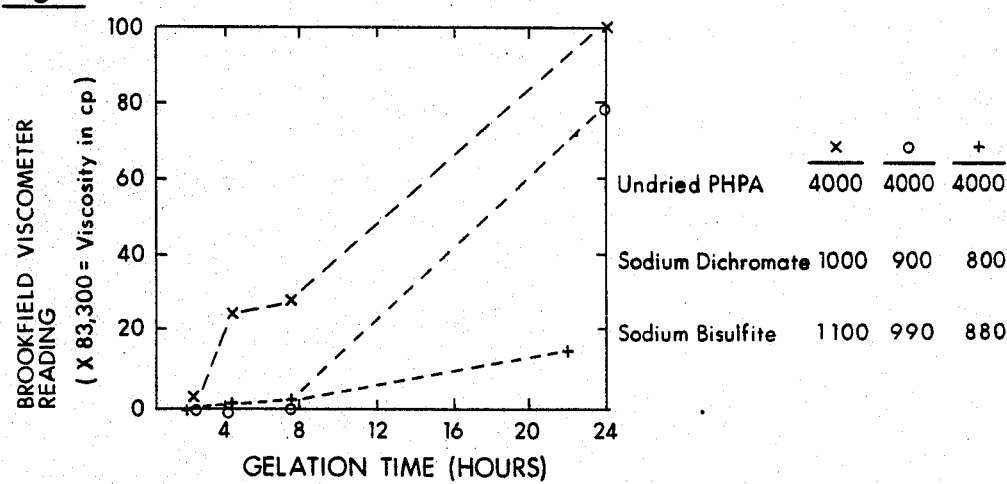
FIG. 3 graphically shows the independent variable, redox catalyst concentration, PHPA concentration and gelation time, as a function of gel viscosity described in Example 3.

Redox catalysts are added to a 4000 ppm PHPA solution containing the same type of produced water and PHPA as Example 1. The line marked "x" has a catalyst concentration of 1000 ppm dichromate and 1100 ppm bisulfite. The catalyst concentration in the line marked "o" is reduced to 90% of "x"; the dichromate concentration of "o" is 900 ppm and the bisulfite concentration is 990 ppm. The catalyst concentration of the line marked "+" is reduced to 80% of "x"; the dichromate concentration of "+" is 800 ppm and the bisulfite concentration is 880 ppm. The results displayed in FIG. 3 indicate that the gelation rate is very sensitive to redox catalyst concentration at a reduced PHPA concentration. The final viscosity of the gel is substantially lower for reduced catalyst concentration.

EXAMPLE 4

Figure 4:
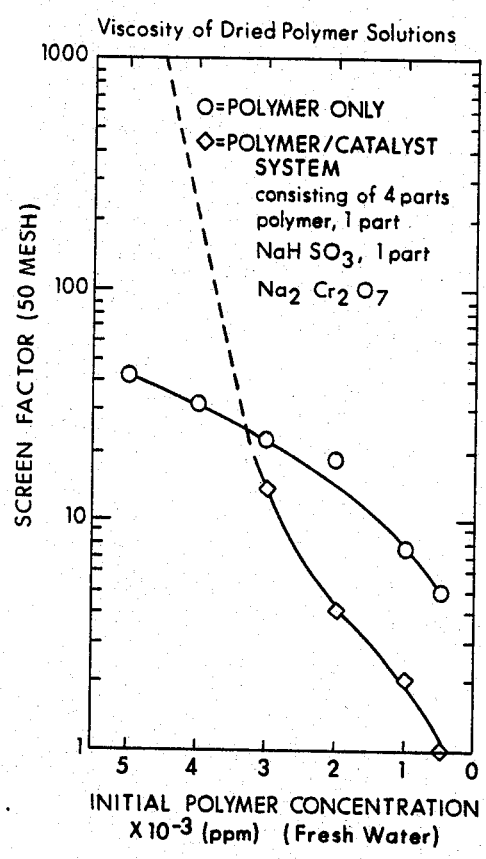
FIG. 4 displays two curves, (1) the viscosity (represented by screen factor) of a polymer solution made from dried polymer as a function of the initial polymer concentration and (2) the viscosity of a polymer/redox catalyst system as a function of the polymer concentration. By comparison, FIG. 5 displays similar curves where the polymer is an undried polymer.

Differing concentrations of a dried PHPA, commercial Dowell polymer (J-333) having a molecular weight of about 5,000,000, are added to a fresh water. The concentrations are shown in FIG. 4 as a function of screen factor on the line marked "o". The screen factor corresponds to the viscosity of the polymer solution. The second line marked " " represents the concentration of a polymer/catalyst system containing polymer, sodium bisulfite, and sodium dichromate in a ratio of 4:1:1 as a function of screen factor.

EXAMPLE 5

Figure 5:
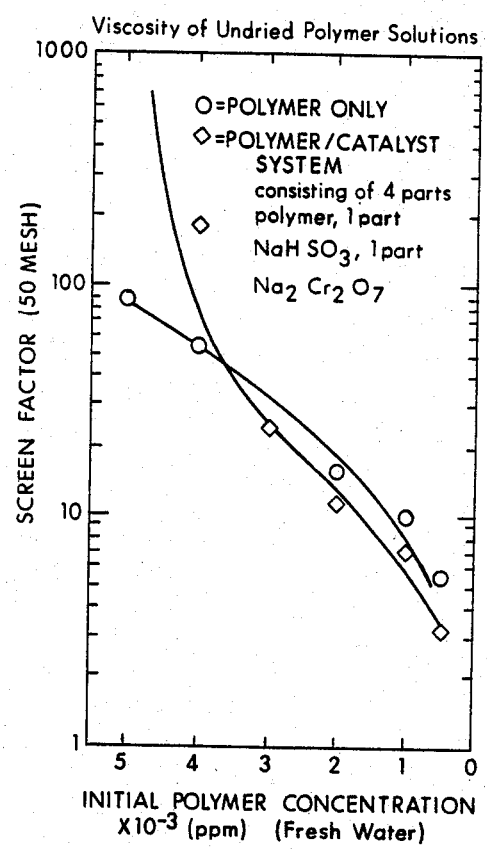

An undried polymer of comparable molecular weight and degree of hydrolysis as the Dowell polymer of Example 4 is mixed with the fresh water of Example 4. The results are shown in FIG. 5 and the symbols correspond to those of FIG. 4. The line marked "o" is the polymer solution only and the line marked " " is the polymer/catalyst system. Comparing FIGS. 4 and 5, it is apparent that the gels produced from dried polymer have very low viscosity at low polymer concentrations, while gels produced from undried polymer have a much higher viscosity at the lower concentrations due to apparent "salting out" of the dried polymer from solution. "Salting out" increases costs substantially by reducing the effectiveness of the dried polymer at low concentrations.

EXAMPLE 6

In an actual field test, a mixture of 5000 ppm undried PHPA and the redox catalysts of Example 1 is prepared. The PHPA has a molecular weight of 3,000,000. The redox catalysts are present in 100% of the stoichiometric ratio. The pH of the mixture is 9.5. The mixture is run through the injection line, which is disconnected from the wellhead, and collected in a drum. Samples from the drum gel is 30 minutes and display off-scale readings on the Brookfield viscometer. Due to the rapid gelation, concentrations of the reactants are cut back to a polymer concentration of 4500 ppm and 90% of the original redox catalyst concentration.

The wellhead pressure of 380 psi is maintained before treatment by a shut-in pressure of 150 psi. Injection is then begun into the well by connecting the injection line to the wellhead. Wellhead samples are taken every hour throughout the treatment. The samples indicate that gelation is occurring too slowly, so the chromic concentration is increased on three occasions during the treatment. Furthermore, the bisulfite does not stay in solution during the treatment as the ambient temperature decreases. Approximately 287 barrels of polymer with redox catalyst are injected into the formation, preceded and followed by a small flush of fluids containing no redox catalysts. The net result is a weak gel.

The injection is restarted with a mixture of 6000 ppm PHPA and 130% of stoichiometric ratio of the redox catalysts. Throughout 10 hours of injection, wellhead samples gel in 30 minutes to an off-scale reading on the Brooksfield viscometer. The wellhead pressure increases by about 250 psi as the tubing fills with the gel-forming mixture. The pressure levels out when the mixture reaches the formation and never exceeds 930 psi during injection into the formation. This indicates that the formation offers less resistance to flow than the tubing, suggesting an extensive fracture network or other highly conductive type formation.

After 167 barrels of the gel-forming mixture are injected into the formation, 10 barrels of solution containing only polymer followed by 28 barrels of water, which represents the tubing volume, are injected into the formation. The well is then shut-in for 48 hours.

After the two treatments, an injection test with normal injection water is performed at a rate of 400 barrels per day. Wellhead pressure is 680 psi at 400 barrels per day of water injection. The treatments have reduced the injectivity of the formation by a factor of about 2.3 due to substantial gelation within the treated zone.

EXAMPLE 7

Different polymer solutions are prepared from an undried PHPA made at Marathon Oil Company's research laboratory in Littleton, Colo. and from commercially available Dow dried PHPA. The undried PHPA has a molecular weight about equal to that of Dow 700 PHPA, i.e. between 3 and 5 million. Dow 1000 has an average molecular weight around 6,000,000 and Dow 500 has a molecular weight between 1 and 3 million. The Dow polymers are all dried PHPA which are then redissolved from the dried form. The polymer solutions have polymer concentrations of 5000 ppm. The chromate and sulfite concentrations are 1250 ppm each. The catalysts are added to the polymer solutions in different orders to produce gels. The form of each resulting gel is recorded empirically in the table below. The results indicate that adding the oxidizing agent prior to the reducing agent to the solution produces a more stable gel.

| Polymer | Conc. (ppm) | Order of Catalyst Addition | Gel Form and Time |
|---|---|---|---|
| Dow 500 | 5000 | $HSO_3^{-1}/Cr_2O_7^{-2}$ | None |
| Dow 700 | 5000 | $HSO_3^{-1}/Cr_2O_7^{-2}$ | None |
| Dow 1000 | 5000 | $HSO_3^{-1}/Cr_2O_7^{-2}$ | Soft gel |
| Dow 500 | 5000 | $Cr_2O_7^{-2}/HSO_3^{-1}$ | Firm (2–4 hrs) |
| Dow 500 | 5000 | $Cr^{+3}/HSO_3^{-1}$ | Firm (Almost Instantaneously) |
| Undried PHPA | 5000 | $HSO_3^{-1}/Cr_2O_7^{2}$ | Viscosity Increase - No Gel |
| Undried PHPA | 5000 | $Cr_2O_7^{-2}/HSO_3^{-1}$ | Firm (2–4 hrs) |

While the foregoing preferred embodiment of the invention has been described and shown, it is understood that other alternatives and modifications, such as those suggested, and others may be made thereto, and follow in the scope of the invention.

What is claimed is:

1. A process for controlling the permeability of a porous matrix comprising the steps of:
   adding an undried partially hydrolyzed polyacrylamide and an oxidizing agent, selected from the group consisting of alkali metal and ammounium salts of hexavalent chromium ions and chromium trioxide, at predetermined concentrations to an aqueous medium;
   thereafter adding a reducing agent, selected from the group consisting of alkali metal and ammonium salts of sulfur-containing ions, at a predetermined concentration to said aqueous medium to produce a gel-forming mixture;
   adjusting the pH of said mixture above about 7 to delay the gelation rate of said gel-forming mixture;
   applying said gel-forming mixture to said porous matrix; and
   reacting said gel-forming mixture in situ at a pH below about 7 to produce a permeability controlling gel, wherein the degree of permeability control is directly proportional to the amount of said mixture applied to said matrix and the concentration of said polyacrylamide and oxidizing and reducing agents in said mixture.

2. The process of claim 1 wherein said polyacrylamide has a molecular weight from about 100,000 to about 10,000,000.

3. The process of claim 1 wherein said oxidizing agent is sodium or potassium dichromate.

4. The process of claim 1 wherein said reducing agent is sodium sulfite.

5. The process of claim 1 wherein said porous matrix is a subterranean hydrocarbon-bearing formation.

6. The process of claim 5 wherein said gel-forming mixture is injected into said subterranean hydrocarbon-bearing formation via a well.

7. The process of claim 1 wherein said mixture is buffered to maintain the basic pH.

8. The process of claim 1 wherein an acid is added in situ to said mixture to reduce the pH of said mixture after said mixture is in place in said formation.

9. The process of claim 1 wherein said porous matrix is an earthen terranean material.

10. The process of claim 9 wherein said permeability controlling gel consolidates said earthen terranean material.

* * * * *

UNITED STATES PATENT AND TRADEMARK OFFICE
CERTIFICATE OF CORRECTION

PATENT NO. : 4,548,272

DATED : October 22, 1985

INVENTOR(S) : Charles J. Norton, David O. Falk, and Alfred D. Hill

It is certified that error appears in the above-identified patent and that said Letters Patent are hereby corrected as shown below:

Col. 6, line 2:   Insert --◊-- between " ".
Col. 6, line 13:  Insert --◊-- between " ".
Col. 6, line 32:  Delete "is" and insert --in--.

Signed and Sealed this

Fourteenth Day of January 1986

[SEAL]

Attest:

DONALD J. QUIGG

Attesting Officer

Commissioner of Patents and Trademarks